United States Patent [19]

Oie

[11] Patent Number: 4,908,810
[45] Date of Patent: Mar. 13, 1990

[54] METHOD AND APPARATUS FOR CONTROLLING A SPINDLE SERVO USING PICKUP POSITION AND SHIFT INFORMATION

[75] Inventor: Takayuki Oie, Saitama, Japan

[73] Assignee: Pioneer Electronic Corporation, Tokyo, Japan

[21] Appl. No.: 46,361

[22] Filed: May 6, 1987

[30] Foreign Application Priority Data

May 6, 1986 [JP] Japan .................................. 61-103502

[51] Int. Cl.$^4$ .............................................. G11B 7/00
[52] U.S. Cl. ................................... 369/50; 360/73.03; 369/32
[58] Field of Search ............................ 369/50, 189, 32; 360/73; 358/342, 322, 324–326, 338

[56] References Cited

U.S. PATENT DOCUMENTS

| | | | |
|---|---|---|---|
| 4,223,349 | 9/1980 | Dakin et al. | |
| 4,338,683 | 7/1982 | Furukawa et al. | 369/50 |
| 4,439,849 | 3/1984 | Nabeshima | 369/50 |
| 4,532,561 | 7/1985 | Kimura et al. | 360/73 |
| 4,543,650 | 9/1985 | Wachi | 369/50 X |
| 4,603,412 | 7/1986 | Yamazaki | 369/50 |
| 4,623,939 | 11/1986 | Machida et al. | 369/50 X |
| 4,646,280 | 2/1987 | Toyosawa | 369/50 |
| 4,672,595 | 6/1987 | Senso | 369/50 |
| 4,675,855 | 6/1987 | Iso et al. | 369/50 X |
| 4,698,695 | 10/1987 | Kosaka et al. | 369/50 X |
| 4,748,608 | 5/1988 | Matsumoto et al. | 360/73.03 |

FOREIGN PATENT DOCUMENTS 59-40348 3/1984 Japan .................................. 369/50

*Primary Examiner*—Aristotelis M. Psitos
*Attorney, Agent, or Firm*—Sughrue, Mion, Zinn, Macpeak & Seas

[57] ABSTRACT

A method of initiating a spindle servo for use in an apparatus which reproduces signals from a video disk. When a spindle servo control loop is opened, a spindle motor is controlled according to a spindle information of a pickup in the radial direction of the disk and according to a shift direction information of the pickup. After the control loop is closed, a difference is detected between the frequency of a regenerative synchronizing signal and a reference synchronizing signal and the spindle motor is controlled according to the frequency difference. When the frequency difference has come down below a predetermined level, the phase difference between the regenerative synchronizing signal and the reference synchronizing signal is detected and the spindle motor is controlled in accordance with the detected phase difference.

6 Claims, 4 Drawing Sheets

4,908,810

METHOD AND APPARATUS FOR CONTROLLING A SPINDLE SERVO USING PICKUP POSITION AND SHIFT INFORMATION

BACKGROUND OF THE INVENTION

1. Field of the Invention

The present invention relates to a method and apparatus for initiating a spindle servo in an information recording disk regenerating apparatus.

2. Description of the Prior Art

A disk regenerating apparatus regenerates information from a recording disk (hereinafter simply called "disk") such as a video disk. Typically, a video signal, recorded on such a video includes video information such as a composite image signal or the like or a digital audio signal is recorded with a compressed time base. A similar digital audio disk has a special regenerating mode or a so-called scan operation requiring a jump operation for jumping the spotlight for reading recorded information of the disk from one track to another track one or more pitch away in addition to a normal sequential regenerating mode.

In the disk regenerating apparatus, there exists a fluctuating component of the time base due to irregular rotation or other defect of a spindle motor whereby the disk is driven to rotate with a regenerative signal obtained through a pickup. To suppress the time base fluctuation, the so-called spindle servo is used. For the spindle servo, a conventional arrangement is such that a regenerative synchronizing signal such as horizontal synchronizing pulse or the like is extracted from the regenerated video signal. A phase difference between the regenerative synchronizing signal and a reference synchronizing signal generated in the apparatus is detected and the rotational frequency of the spindle motor is controlled so as to minimize the phase difference. For the jump operation, on the other hand, the spotlight is controlled to follow a recording track of the disk, i.e., a servo loop of the tracking servo opens up during jumping and thus the regenerative synchronizing signal cannot be obtained. Therefore control on the spindle servo has not hitherto been made during the time period of jumping.

In such a disk regenerating apparatus, where a so-called CLV (constant linear velocity) disk is jumped across tracks during regeneration, the disk is changed in speed according to a radial disk position of the pickup. Accordingly, a control is not given at any time that the tracking servo loop is kept open. Thus, in a prior art control system in which the servo is initialized after the loop closes, a considerably long time is required before the spindle servo system is stabilized.

SUMMARY OF THE INVENTION

Therefore, an object of the present invention is to provide a method and apparatus for initiating a spindle servo whereby the time for initiating the servo system after a jump operation across a disk in which information is recorded can be shortened. The spindle motor needs to be stabilized after changing a recording angular velocity of a CLV disk or the like.

In the method and apparatus for initiating a spindle servo according to the invention, the improvement is characterized in that a spindle motor is controlled according to information on the radial position of a pickup on and according to information on the shift direction of the pickup when a tracking servo loop is open. A frequency difference between a regenerative synchronizing signal included in a read output of the pickup and a reference synchronizing signal is first detected. The spindle motor is controlled according to the frequency difference after the tracking servo loop closes. A phase difference between the regenerative synchronizing signal and the reference synchronizing signal is detected at the point in time when the frequency difference decreases to a predetermined value or less. Thereafter, the spindle motor is controlled according to the phase difference.

In the method and apparatus for initiating the spindle servo according to the invention, the improvement is further characterized in that the reference synchronizing signal is reset at the point in time when the frequency difference becomes a predetermined value or less and is so maintained until the regenerative synchronizing signal is generated next.

DETAILED DESCRIPTION OF PREFERRED EMBODIMENTS

A preferred embodiment of the invention will now be described in detail with reference to the accompanying drawings.

Figure 1:
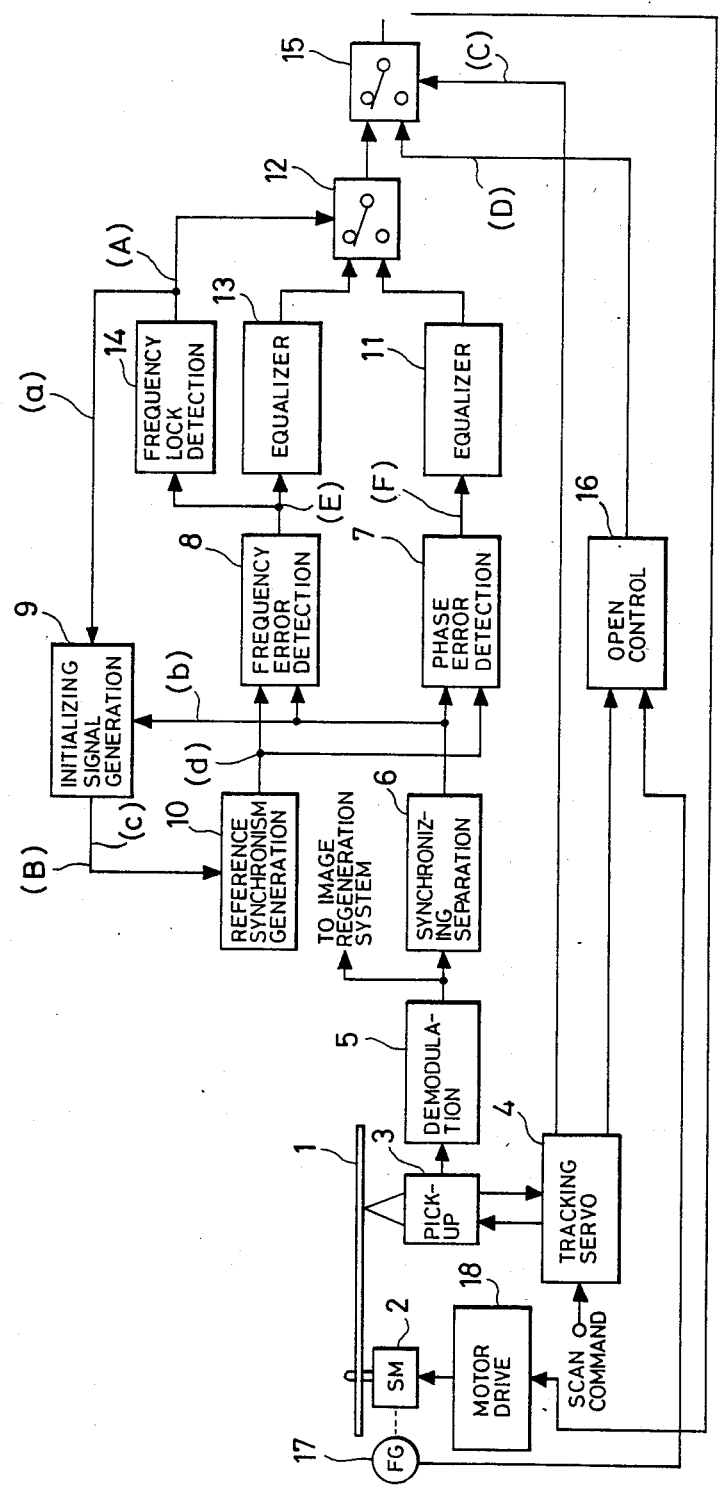
FIG. 1 is a block diagram representing a spindle servo mechanism relating to the invention.

FIG. 1 is a block diagram representing a spindle servo mechanism which is one embodiment of the invention. In the drawing, a video disk 1 is driven by a spindle motor 2, and information recorded therein is read by a pickup 3. The pickup 3 is controlled in a radial position of the disk 1 by a tracking servo circuit 4 so as to follow a desired spiral track. In the case of a special regenerating mode requiring a jump operation such as scanning or the like, the tracking servo circuit 4 controls an information reading spotlight generated from the pickup 3. The tracking servo circuit 4 jumps according to a command from a control circuit (not indicated) and outputs an information signal indicating an open/close state of a servo loop and another information signal indicating a shift direction of the pickup 3. One example of its construction has been disclosed in Japanese Utility Model Laid-open No. 33435/1982 and others are generally known.

Read information from the pickup 3 is demodulated to a video signal by a demodulator 5. The video signal is fed to an image regenerating system for regeneration. However, the construction of the image regenerating system is well-known, and hence a further description thereof will be omitted. The regenerated video signal is also fed to a synchronizing separator circuit 6. The synchronizing separator circuit 6 separates the regenerative video signal to extract a regenerative synchronizing signal b such as a horizontal synchronizing pulse or the like included in the regenerated video signal. The extracted regenerative synchronizing signal b operates as one input to both a phase error detection circuit 7 and a frequency error detection circuit 8. The extracted regenerative synchronizing signal b is further fed also to an initializing signal generation circuit 9. On the other hand, a reference synchronizing signal d with a predetermined frequency is generated by a reference synchronism generation circuit 10 and is fed as another input to both the phase error detection circuit 7 and the frequency error detection circuit 8.

The phase error detection circuit 7 detects a phase difference between the reference synchronizing signal d and the regenerative synchronizing signal b. It generates a phase difference signal F indicating the phase difference, which is inputted to a first selector switch 12 through an equalizer circuit 11. On the other hand, the frequency error detection circuit 8 detects a frequency difference between the reference synchronizing signal d and the regenerative synchronizing signal b and generates a frequency difference signal E indicating the frequency difference. The frequency difference signal E is also inputted to the first selector switch 12 through another equalizer circuit 13 and is also used directly as an input to a frequency lock detection circuit 14. The frequency lock detection circuit 14 generates a lock detection signal a by detecting a level of the frequency difference signal E having come to a predetermined value or below. In other words, the frequency lock detection circuit 14 generates a lock detection signal when the frequency of the regenerative synchronizing signal substantially equals the frequency of the reference synchronizing signal. That is, the frequency difference between the reference synchronizing signal d and the regenerative synchronizing signal b has come to a predetermined value or below. The detection signal a is fed to the initializing signal generation circuit 9 and to the first selector switch 12.

The initializing signal generation circuit 9 generates a reset pulse having a width covering the time period from the time when a lock detection output from the frequency lock detection circuit 14 is generated to the time when the regenerative synchronizing signal b is next generated. The initializing signal generation circuit 9 then resets (or initializes) the reference synchronism generation circuit 10. The first selector switch 12 is switched to output the phase difference signal F coming from the phase error detection circuit 7 when the lock detection signal a is generated by the frequency lock detection circuit 14 and also is switched to output the frequency difference signal E coming from the frequency error detection circuit 8 when the lock detection signal a is not being generated. The phase difference signal F or the frequency difference signal E selected by the selector switch 12 works as one input of a second selector switch 15.

An open control circuit 16 generates a drive signal D according to a position information of the pickup 3 in the radial direction of the disk 1 and a shift direction information of the pickup 3. The drive signal D operates as another input of the second selector switch 15. The radial position information for the pickup 3 is obtainable from a time period of FG pulses generated from a frequency generator (FG) interlocked with the spindle motor 2. That is, in the case of CLV disk regeneration, the disk 1 is changed in speed according to the radial position of the pickup 3. Therefore, the disk radial position of the pickup 3 and the period of the FG pulses (rotational frequency of the spindle motor 2) should be related to correspond with each other. Then, the shift direction information of the pickup 3 is obtainable from a jump direction (forward or reverse) information in the tracking servo circuit 4.

The open control circuit generates a motor drive signal for keeping a constant linear velocity of the pickup position on the disk. For keeping the disk linear velocity of the pickup position constant when the pickup 3 is shifted radially of the disk, an angular acceleration α can be given as:

$$\alpha = d\omega/dt = -V_l \cdot V_r/r^2$$
$$= -V_r \cdot \omega^2/V_l$$

based upon the following relations:

$$\omega = V_l/r \quad d\omega/dr = -V_l/r^2$$
$$dr/dt = V_r \quad d\omega/dt = -V_l \cdot V_r/r^2$$

where $V_l$ is a linear disk velocity of the pickup 3, $V_r$ is a shift velocity of the pickup 3, r is a radial disk position of the pickup 3, and ω is an angular velocity of the disk 1.

A torque T to be generated by the spindle motor 2 for the angular acceleration α to be secured will be obtained through the following equation:

$$T = J \cdot \alpha$$
$$= -JV_r\omega^2/V_l$$

Where J is a moment of inertia of a rotor of the spindle motor 2. Then, the value of ω is obtainable through a measurement of the period of the FG pulses. Here, $V_l$ and J are constants, and the linear disk velocity $V_l$ is determined by the tracking servo system 4 and is regarded as a constant with the code inverted according to the direction in which the pickup 3 is shifted. Thus the torque T can be obtained through the following equation:

$$T = K\omega^2 \text{ (K: constant).}$$

Figure 5:
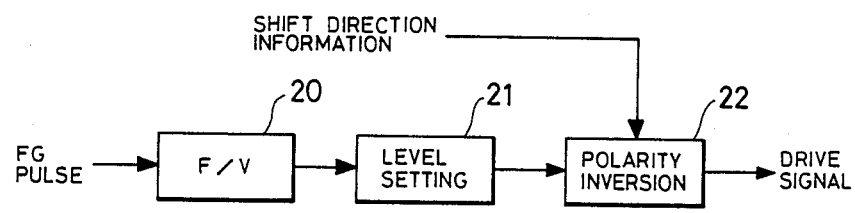
FIG. 5 is a block diagram representing one example of a construction of the open control circuit in FIG. 1.

As described, the open control circuit 16 generates a drive signal D with a level set according to the period of the FG pulses which indicate a radial position of the pickup 3 on the disk 1. One possible design shown in FIG. 5 of the open control circuit 16 is such that the FG pulses are converted into a voltage through a frequency-to-voltage (F/V) converter 20 and has the level set by a level setting circuit 21. Then a polarity of this voltage is set by a polarity inversion circuit 22 according to the shift direction information from the tracking servo circuit 4. There is thereby obtained the drive signal D changing continuously according to the period of the FG pulses, however, a design that will set several arbitrary levels of the drive signal D beforehand and then select an appropriate level according to the period of the FG pulses may be used.

A servo loop in the tracking servo circuit 4 is kept open, for example, from the point in time when an actuator (not indicated) for biasing the spotlight in a disk radial direction reaches a predetermined displacement position to the point in time when it returns to a neutral position or thereabout. A tracking servo circuit 4 generates a control signal C which assumes a high level when the loop is opened but a low level when it is closed. This control signal C is fed to the second selector switch 15. The second selector switch 15 selects the phase difference signal F or the frequency difference signal E which has been fed through the first selector switch 12 when the control signal C has a low level but selects instead the drive signal coming from the open control circuit 16 when the control signal C is at a high level. The so selected signal is fed to a motor driving circuit 18 for driving the spindle motor 2. Then, open/close timing of the tracking servo loop coordinates with open/close timing of the spindle servo loop.

Figure 2:
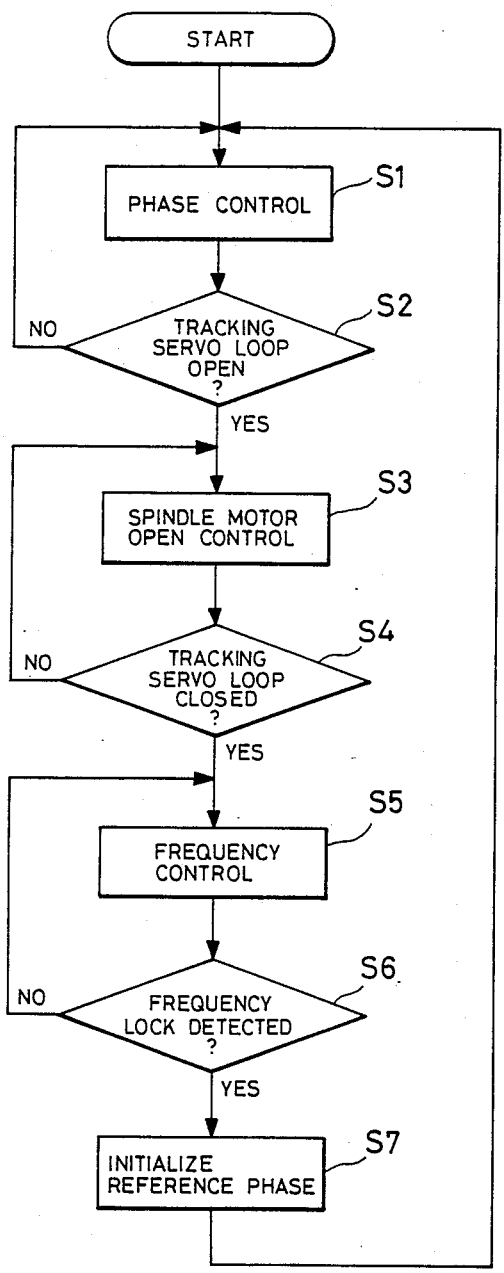
FIG. 2 is a flowchart showing a procedure for carrying out a method for initiating the spindle servo according to the invention.
Figure 3:
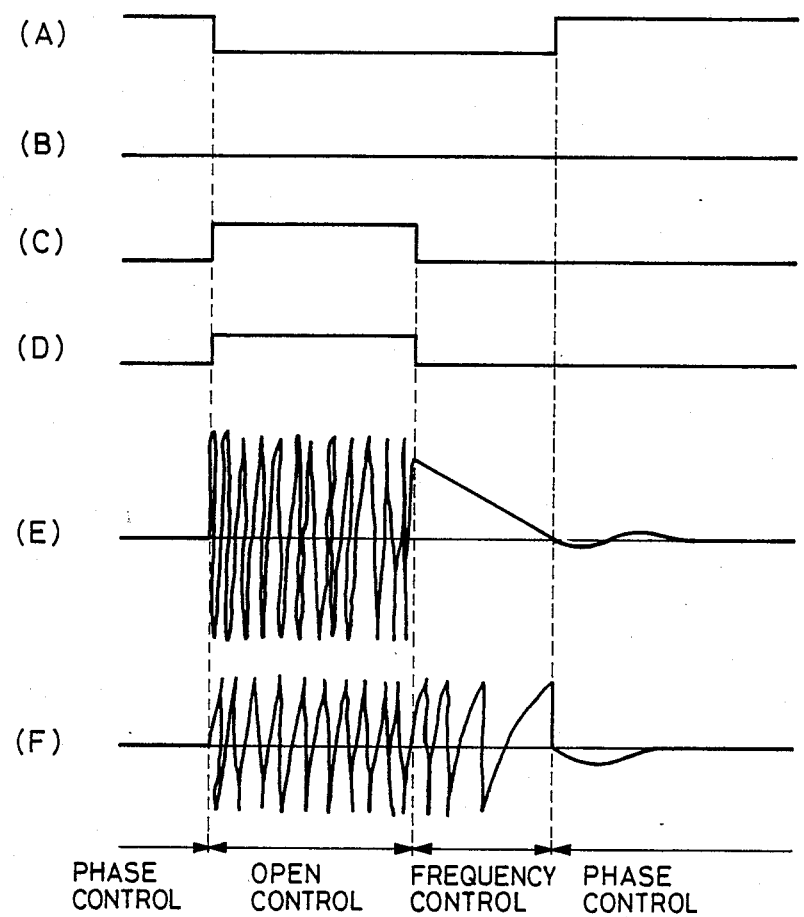
FIG. 3(a-f) is a waveform diagram of each part of FIG. 1, illustrating a initiating operation of the spindle servo.

A servo initiation operation at the time of scanning in CLV disk regeneration as applied to the spindle servo mechanism constructed as described above will be described with reference to the waveform diagram of FIG. 3 according to the flowchart of FIG. 2.

First, when a slider (not indicated) mounted with the pickup 3 is shifted radially on the disk at a predetermined speed according to a scan command, an actuator (not indicated) incorporated in the pickup 3 can vibrate to get the spotlight to follow a recording track of the disk 1. In such a state, the tracking servo loop is kept closed and a frequency difference between the reference synchronizing signal and the regenerative synchronizing signal is brought to a value at or below a predetermined frequency value. Accordingly, the phase difference signal coming from the phase error detection circuit 7 is thereafter selected by the selector switches 12 and 15, and the spindle motor 3 is controlled. That is, a phase control is carried out according to the phase difference signal (STEP 1).

When the actuator of the pickup 3 reaches a predetermined displacement position, the tracking servo loop opens (STEP 2), and the high-level control signal C is generated by the tracking servo circuit 4. The second selector switch 15 selects the drive signal D generated by the open control circuit 16 for the period in which the control signal C is generated and then feeds it to the spindle motor 2 through the motor driving circuit 18. Thus, the spindle motor 2 is controlled, i.e. open control is carried out according to the position information of the pickup 3 in the radial direction of the disk and the shift direction information of the pickup 3 (STEP 3). The spindle motor 2 is controlled, as described above, during the period in which the tracking servo loop is opened according to the position information of the pickup 3. Thus, a rotational frequency of the spindle motor 2 is set beforehand to a value approximately equal to the rotational frequency when the loop is closed. Therefore the spindle servo after the tracking servo loop is closed can be easily reinitiated.

When the tracking servo loop is opened, the pickup actuator returns to the neutral position or thereabout dependent upon the resilience of the elastic support and then the servo loop is again closed. During the period in which the servo loop is opened, the spotlight jumps over a predetermined number of recording tracks. When the tracking servo loop is again kept closed (STEP 4), a low-level control signal C is generated by the tracking servo circuit 4. The second selector switch 15 will select the output of the first selector switch 12 in response to the control signal C. Then initially, the frequency remains unlocked (the frequency difference between the reference synchronizing signal d and the regenerative synchronizing signal b being greater than the predetermined value) from the point in time when the tracking servo loop was opened and thus the lock detection output A of the frequency lock detection circuit 14 stands at a low level. Therefore, the first selector switch 12 selects the frequency difference signal E coming from the frequency error detection circuit 8 and feeds it to the spindle motor 2 through the selector switch 15 and the motor driving circuit 18. Thus, the spindle motor 3 is controlled, i.e. frequency control is carried out according to the frequency difference signal (STEP 5). When the frequency difference between the reference synchronizing signal d and the regenerative synchronizing signal b is reduced to a predetermined value or less according to the frequency control, the frequency lock is detected by the frequency lock detection circuit 14 (STEP 6). In this case the initializing signal generation circuit 9 generates a reset pulse B to initialize a phase of the reference synchronizing signal.

Figure 4:
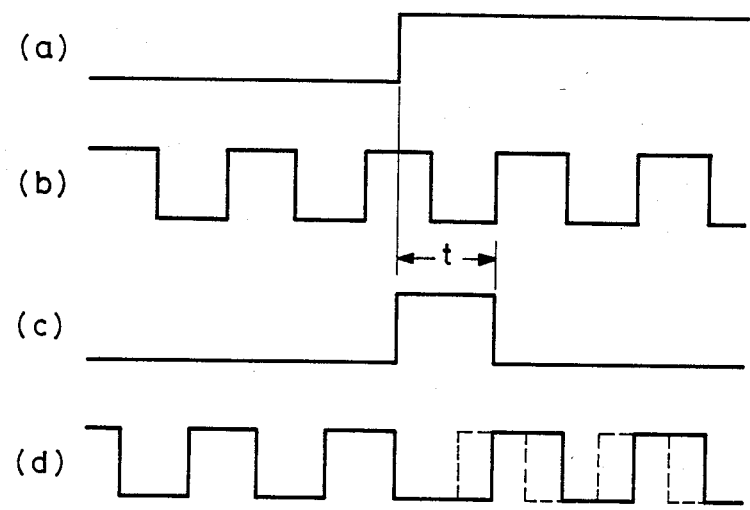
FIG. 4(a-d) is a waveform diagram of signals appearing in different parts of FIG. 1, and illustrates an initializing operation of a reference synchronizing signal.

Referring in detail to the initializing operation with reference to the waveform diagram of FIG. 4, the initializing signal generation circuit 9 generates a reset pulse c (corresponding to B) having a pulse width covering the period from the point in time when the detection output a (corresponding to A) is generated by the frequency lock detection circuit 14 to the point in time when the regenerative synchronizing signal b is next generated as a rising pulse. The initializing signal generation circuit 9 feeds the reset pulse c to the reference synchronism generation circuit 10 to reset the reference synchronizing signal d. Thus the phase of the reference synchronizing signal is adjusted to coincide with the phase of the regenerative synchronizing signal b, i.e., the phase of the reference synchronizing signal d is initialized (STEP 7). A non-reset waveform for the reference synchronizing signal d is indicated by a broken line in trace (d) of FIG. 4.

Meanwhile, when the lock detection output A (corresponding to a) is generated by the frequency lock detection circuit 14, the first selector switch 12 selects the phase difference signal F. Therefore, phase control will be carried out again after the phase of the reference synchronizing signal d has been initialized (STEP 1). As described, since the phase of the reference synchronizing signal d has already coincided with the phase of the regenerative synchronizing signal b, the phase can be initialized or stabilized securely and quickly by proceeding to phase control after initializing the phase of the reference synchronizing signal d.

Then, in the aforementioned embodiment, the description has referred to the case where a servo initiation operation in CLV disk regeneration at the time of scanning is performed through a hardware implementation. However, it is also possible that the servo initiation procedure shown in the flowchart of FIG. 2 is programmed beforehand by means of a microcomputer, and such a servo initiation operation will be carried out on the microcomputer in a soft-ware mode.

As described above, according to the invention, the spindle motor is controlled according to a disk radial position information of the pickup even when the tracking servo loop is open. After the radial position information of the pickup even when the tracking servo loop is open, and after the tracking servo loop is closed, a frequency control is carried out first, then the spindle servo is stabilized by shifting to a phase control at the point in time when a frequency difference between the regenerative synchronizing signal and the reference synchronizing signal becomes a predetermined value or below. Thus, the phase control may ensue with frequencies and phases of the regenerative synchronizing signal and the reference synchronizing signal kept almost coincident with each other beforehand. Therefore the time for initiating the spindle servo at the time of scanning can be shortened.

Then, when shifting to the phase control from the frequency control, the reference synchronizing signal is reset while the regenerative synchronizing signal is generated next after the frequency difference becomes a predetermined value or less. A phase of the reference synchronizing signal is then initialized. Thus, the phase control may ensue with a zero phase difference, thereby stabilizing the phase securely and quickly.

What is claimed is:

1. A method for controlling a spindle servo in an information recording disk regenerating apparatus including a pickup shiftable radially across an information recording disk on which information is recorded with a varying recording angular velocity so as to read information recorded on said disk, a spindle servo loop for controlling a rotational frequency of a spindle motor for driving said disk according to an error between a regenerative synchronizing signal and a reference synchronizing signal generated by a reference synchronizing generator, the regenerative synchronizing signal being included in a read output of said pickup, and a tracking servo for indicating one of an open and closed state of the spindle servo loop, said method comprising the steps of:

determining position information of said pickup in the radial direction of the disk and shift direction information of said pickup;

controlling said spindle motor according to the position and shift direction information when said spindle servo loop is open;

detecting a frequency difference between said regenerative synchronizing signal and said reference synchronizing signal;

controlling said spindle motor according to said frequency difference after said spindle servo loop is closed;

detecting, when said spindle servo loop is closed, a phase difference between said regenerative synchronizing signal and said reference synchronizing signal;

determining a frequency lock condition when said frequency difference is such that the frequencies of said regenerative synchronizing signal and the reference synchronizing signal are substantially equal; and controlling said spindle motor according to said detected phase difference after said frequency lock condition has been determined.

2. A spindle servo mechanism in an information recording disk regenerating apparatus including a pickup shiftable radially of an information recording disk on which information is recorded with a varying recording angular velocity so as to read information recorded on said disk, and a spindle servo loop for controlling a rotational frequency of a spindle motor for driving said disk according to an error between a regenerative synchronizing signal and a reference synchronizing signal generated by a reference synchronizing generator, the regenerative synchronizing signal being included in a read output of said pickup, and a tracking servo for indicating one of an open and closed state of spindle servo loop, said mechanism comprising:

means for generating a first drive signal according to position information of said pickup in the radial direction of the disk and shift direction information of said pickup;

means for generating a second drive signal according to a frequency difference between said regenerative synchronizing signal and said reference synchronizing signal;

means for generating a detection output responsive to a detection of a value of said frequency difference which indicates that the frequencies of the regenerative synchronizing signal and the reference synchronizing signal are substantially equal;

means for generating a third drive signal according to a phase difference between said regenerative synchronizing signal and said reference synchronizing signal, said third drive signal generating means operable only when the spindle servo loop is closed;

means for selectively outputting said first drive signal when said spindle servo loop is opened, outputting said second drive signal during the period from the point in time when said spindle servo loop is closed to the point in time when said detection output is generated, and outputting said third drive signal after said detection output is generated; and wherein said servo loop includes means for controlling said spindle motor according to said first, second or third drive signal outputted by said outputting means.

3. A method for controlling a spindle servo in an information recording disk regenerating apparatus including a pickup shiftable radially of an information recording disk on which information is recorded with a varying recording angular velocity so as to read information recorded on said disk, a spindle servo loop for controlling a rotational frequency of a spindle motor for driving said disk according to an error between a regenerative synchronizing signal and a reference synchronizing signal generated by a reference synchronizing generator, the regenerative synchronizing signal being included in a read output of said pickup, and a tracking servo for indicating one of an open and a closed state of the spindle servo loop, said method comprising the steps of:

determining position information of said pickup in a radial direction of the disk and shift direction information of said pickup;

controlling said spindle motor according to the position and shift direction information when said spindle loop is open;

detecting a frequency difference between said regenerative synchronizing signal and said reference synchronizing signal;

controlling said spindle motor according to said frequency difference after said spindle servo loop is closed;

resetting said reference synchronizing signal when the spindle servo loop is closed so that the phase of the reset reference synchronizing signal substantially coincides with the phase of the regenerative synchronizing signal, said reference synchronizing signal being reset by an initializing signal generator at the point in time when said frequency difference becomes a value indicating that the frequencies of the regenerative synchronizing signal and the reference synchronizing signal are substantially equal until said regenerative synchronizing signal is generated by the reference synchronizing generator next thereafter;

detecting a phase difference between said regenerative synchronizing signal and said reference synchronizing signal; and controlling said spindle motor according to the phase difference after said reference synchronizing signal has been reset.

4. A spindle servo mechanism in an information recording disk regenerating apparatus including a pickup shiftable radially of an information recording disk on which information is recorded with a varying recording angular velocity so as to read information recorded on said disk, a spindle servo loop for controlling a rotational frequency of a spindle motor for driving said disk according to an error between a regenerative synchronizing signal and a reference synchronizing signal generated by a reference synchronizing generator, the regenerative synchronizing signals being included in a read output of said pickup, and a tracking servo for indicating one of an open and closed state of the spindle serve loop, said mechanism comprising:

means for generating a first drive signal according to position information of said pickup in the direction radial of the disk and shift direction information of said pickup;

means for generating a second drive signal according to a frequency difference between said regenerative synchronizing signal and said reference synchronizing signal;

means for generating a detection output when said frequency difference is equal to a value indicating that the frequencies of the regenerative synchronizing signal and the reference synchronizing signal are substantially equal;

means for resetting said reference synchronizing signal so that the phase of said reference synchronizing signal substantially coincides with a phase of the regenerative synchronizing signal, the reference synchronizing signal being reset for the period from the point in time when said detection output is generated to the point in time when said regenerative synchronizing signal is generated next by the reference synchronizing generator;

means for generating a third drive signal according to a phase difference between said next regenerative synchronizing signal and said reset reference synchronizing signal;

means for selectively outputting said first drive signal when said spindle servo loop is opened, said second drive signal during the period from the point in time when said spindle servo loop is closed to the point in time when said detection output is generated and said third drive signal after said detection output is generated; and wherein said spindle servo loop includes means for controlling said spindle motor according to said first, second or third drive signal outputted by said outputting means.

5. A method for controlling a spindle servo in an information recording disk regenerating apparatus including a pickup movable radially across an information recording disk on which information is recorded for reading information recorded on the disk, a spindle servo loop for controlling a rotational frequency of a spindle motor, the spindle motor being operable for driving the disk according to a difference between a reference synchronizing signal generated by a reference synchronizing generator and a regenerative synchronizing signal, and a tracking servo for indicating one of an opened and closed state of the spindle servo loop, the regenerative synchronizing signal being extracted from a read output of the pickup, the spindle servo loop being opened during a jump operation in which the pickup jumps from a first track to a second track of the disk, the second track being at least one pitch away from the first track, the method comprising the steps of:

controlling, when the spindle loop is opened, the spindle motor according to position information of the pickup, and according to shift direction information of the pickup, the position information representing a position of the pickup relative to the radial direction of the disk, and the shift direction information representing the radial direction in which the pickup jumps during the jump operation;

comparing the frequency of the regenerative synchronizing signal with the frequency of the reference synchronizing signal, and detecting a frequency difference therebetween;

controlling, when the spindle servo loop is closed, the spindle motor according to the detected frequency difference so that the regenerative synchronizing signal approaches the frequency of the reference synchronizing signal;

resetting the frequency of the reference synchronizing signal when the detected frequency difference is equal to a value indicating that the frequencies of said regenerative synchronizing signal and the reference synchronizing signal are substantially equal, the regenerative synchronizing signal which caused the frequency difference to be equal to the value being termed the first regenerative synchronizing signal, the reference synchronizing signal being reset so that its phase substantially coincides with the phase of the first regenerative synchronizing signal;

detecting, after the reference synchronizing signal is reset, a phase difference between a regenerative synchronizing signal and the reset reference synchronizing signal; and controlling the spindle motor according to the detected phase difference.

6. An apparatus for controlling a spindle servo in an information recording disk regenerating apparatus including a pickup movable radially across an information recording disk on which information is recorded for reading information recorded on the disk, a spindle servo loop for controlling a rotational frequency of a spindle motor, the spindle motor being operable for driving the disk according to a difference between a reference synchronizing signal generated by a reference synchronizing generator and a regenerative synchronizing signal, and a tracking servo for indicating one of an opened and closed state of the spindle servo loop, the regenerative synchronizing signal being extracted from a read output of the pickup, the spindle servo loop being opened during a jump operation in which the pickup jumps from a first track to a second track of the disk, the second track being at least one pitch away from the first track, the apparatus comprising:

means for determining position information of the pickup and shift direction information of the pickup, the position information representing a position of the pickup relative to the radial direction of the disk, and shift direction information representing the radial direction in which the pickup jumps during the jump operation;

means, operable when the spindle servo loop is closed, for controlling the spindle motor according to the position and shift direction information;

means for comparing the frequency of the regenerative synchronizing signal with the frequency of the reference synchronizing signal and for detecting a frequency difference therebetween;

means, operable when the spindle servo loop is closed, for controlling the spindle motor according to the detected frequency difference so that the regenerative synchronizing signal approaches the frequency of the reference synchronizing signal;

means for resetting the frequency of the reference synchronizing signal when the detected frequency difference is equal to a value indicating that the frequencies of the regenerative synchronizing signal and the reference synchronizing signal are substantially equal, the regenerative synchronizing signal which caused the frequency difference to be equal to the value being termed the first regenerative synchronizing signal, the reference synchronizing signal being reset so that its phase substantially coincides with the phase of the first regenerative synchronizing signal;

means, operable after the reference synchronizing signal is reset, for detecting a phase difference between a regenerative synchronizing signal and the reset reference synchronizing signal; and means for controlling the spindle motor according to the detected phase difference.

* * * * *